United States Patent
Vallomy

(10) Patent No.: US 6,438,154 B2
(45) Date of Patent: Aug. 20, 2002

(54) METHOD AND APPARATUS FOR RECOVERING METAL VALUES FROM LIQUID SLAG AN BAGHOUSE DUST OF AN ELECTRIC ARC FURNACE

(76) Inventor: John A. Vallomy, 1513 Dennbriar Dr., Concord, NC (US) 28027

(*) Notice: Subject to any disclaimer, the term of this patent is extended or adjusted under 35 U.S.C. 154(b) by 0 days.

(21) Appl. No.: 09/785,819

(22) Filed: Feb. 16, 2001

Related U.S. Application Data
(60) Provisional application No. 60/183,235, filed on Feb. 17, 2000.

(51) Int. Cl.$^7$ .............................. F27D 17/00; F27B 14/00
(52) U.S. Cl. ................................ 373/9; 373/81; 373/84; 373/78; 75/564
(58) Field of Search ...................... 373/2, 8, 9, 78, 373/79, 80, 81, 83, 84; 266/44, 45, 236, 240; 75/10.14, 10.12, 10.46, 585, 586, 10.31, 564

(56) References Cited

U.S. PATENT DOCUMENTS

| | | | | |
|---|---|---|---|---|
| 3,612,740 A | * | 10/1971 | Gierek | 373/78 |
| 4,466,104 A | * | 8/1984 | Walzel | 373/78 |
| 4,468,781 A | * | 8/1984 | Buhler | 373/84 |
| 4,471,487 A | * | 9/1984 | Hoffmann et al. | 373/78 |
| 4,736,383 A | * | 4/1988 | Meierling | 373/78 |
| 5,019,160 A | * | 5/1991 | Harada et al. | 75/564 |
| 5,499,264 A | * | 3/1996 | Schaller et al. | 373/78 |
| 5,850,413 A | * | 12/1998 | Gensini et al. | 373/84 |
| 6,157,665 A | * | 12/2000 | Benedetti et al. | 373/79 |
| 6,201,826 B1 | * | 3/2001 | Giannoulidis et al. | 373/78 |

* cited by examiner

Primary Examiner—Tu Ba Hoang
(74) Attorney, Agent, or Firm—Dougherty & Clements LLP

(57) ABSTRACT

An apparatus and method for processing liquid slag and baghouse dust from a steelmaking furnace such as an EAF to recover valuable metals from the slag and dust includes a treatment vessel having a movable lower shell portion for receiving liquid slag and an upper shell portion that couples with the movable lower shell portion during heat activation of the treatment vessel. The slag is combined with silicon dioxide, a reducing agent, baghouse dust, and an inert gas before being heated to between approximately 1400° C. and 3000° C. The heat treatment results in a molten reduced iron and manganese metallic material, a treated slag layer, and an off-gas containing lead, zinc, and carbon monoxide. The off-gas is combusted, cooled, and solidified, resulting in lead oxide and zinc oxide. The slag layer is tapped, cooled, and solidified. The metallic layer is tapped for recycle in the steel making process.

16 Claims, 3 Drawing Sheets

METHOD AND APPARATUS FOR RECOVERING METAL VALUES FROM LIQUID SLAG AN BAGHOUSE DUST OF AN ELECTRIC ARC FURNACE

CROSS REFERENCE TO RELATED APPLICATION

This application claims the benefit of U.S. Provisional Application No. 60/183,235 filed on Feb. 17, 2000.

FIELD OF THE INVENTION

The present invention relates to an apparatus and method for processing the liquid slag and baghouse dust waste byproducts of an electric arc furnace to recover valuable metal components therefrom. The present invention further relates to an apparatus and method for processing the liquid slag and baghouse dust byproducts of an electric arc furnace to reduce the quantity of waste byproducts.

BACKGROUND OF THE INVENTION

The worldwide steel industry produces over 750 million tons of crude steel each year. The modern production of steel produces a variety of waste products which are potentially harmful to the environment and the disposal of which is costly. The most predominant of the waste products are slag and steel refining dust.

For every tonne (metric ton or 1000 kilograms) of liquid steel produced by an electric arc furnace (EAF), approximately 110 kg (kilograms) of liquid slag and about 11 kg of steel refining dust is produced. The composition of the slag depends upon the quality of the metallic charge (commercial scrap metal, DRI, etc.) being introduced into the EAF as well as the type of steel being produced and the other components added to the EAF in the production and refining of the steel.

Presently, liquid slag is removed from a steelmaking furnace, such as an electric arc furnace, by a process known as deslagging, in which slag is decanted off of a lower layer of molten metal. During deslagging, residual amounts of valuable metal are inevitably trapped within the liquid slag and subsequently decanted off along with the liquid slag. Metals may also be accidently precluded in the liquid stage during the tapping operation. In an effort to recover such lost metal, liquid slag from the melting furnace has traditionally been discharged into a slag yard where the liquid slag is allowed to cool, and the resulting solid slag is crushed and treated to recover part of the metal value. Some forms of crushed slag, once aged, may be used as a base in road construction. However, slag from an electric arc furnace may not be used in the cement industry because of the less appropriate chemical composition and the increased variability of the EAF slag compared to typical blast furnace slag.

From an environmental standpoint, the handling of slag from an EAF to the slag yard contributes heavily to the pollution of the steelmaking plant and may also be hazardous, depending upon the chemical composition of the slag. When components of the slag are leachable, the slag must be disposed of in a landfill.

Steel refining dust and vaporized chemical components produced during the steel making process provide another waste stream of potential pollutants. Components which escape from the EAF in the form of dust or vapor include zinc, iron, lead, chlorine, magnesium, manganese, and small percentages of other metals, mostly as oxides. Although the dust and vapor (collectively baghouse dust) can be captured with conventional baghouse equipment, the captured baghouse dust must be treated as hazardous waste because of its composition.

Presently, the dust is captured in and collected from the baghouse and subsequently shipped to be processed, to recover mostly zinc and lead. The baghouse dust is considered to be hazardous, due to the potentially hazardous materials it contains, and therefore must always be handled appropriately. Thus, steel production utilizing a typical EAF results in a slag waste stream and a baghouse dust waste stream, both of which contain valuable metallic materials.

What is needed is an apparatus and method for processing liquid slag and baghouse dust from an EAF that recovers metal values from the slag and dust. Further needed is an apparatus and method for processing liquid slag and baghouse dust from an EAF that minimizes pollution at the corresponding steelmaking plant from which the slag and dust are produced by reducing the amount of hazardous materials present in the slag and baghouse dust waste streams. Still further needed is an apparatus and method for processing liquid slag and baghouse dust from an EAF that is energy efficient and provides for safe handling and reduced disposal costs of the slag and dust.

SUMMARY OF THE INVENTION

The invention provides an apparatus and method for processing liquid slag and baghouse dust from an EAF that recovers valuable metal components from the slag and dust. The invention also provides an apparatus and method for processing liquid slag and baghouse dust from an EAF that minimizes the pollution of the corresponding steelmaking plant from which the slag and dust are produced. The invention also provides an apparatus and method for processing liquid slag and baghouse dust from an EAF that is energy efficient and provides for safe handling and reduced disposal costs.

The invented apparatus includes a treatment vessel having a moveable lower shell portion for receiving liquid slag. Slag and residual metal values are introduced to the lower shell portion from an electric arc furnace (EAF) during deslagging. In the preferred embodiment, preheated sand ($SiO_2$) is introduced into the liquid slag that is present in the lower shell of the furnace. The preheated sand helps to maintain slag in a liquid state and reduces the amount of energy or heat required to process slag. The treatment vessel also includes an upper shell portion that couples with the moveable lower shell portion prior to activation of the treatment vessel. After adding preheated sand, the upper shell portion is coupled to the movable lower shell portion, and the treatment vessel is heat activated. The treatment vessel of the invention is preferably operated by an AC power source. Alternative embodiments include but are not limited to the use of a DC or a plasma power source for operation of the treatment vessel.

Upon heat activation of the treatment vessel, carbon is introduced into the slag as a reducing agent. Baghouse dust is also introduced to the treatment vessel. During treatment, the molten iron oxide (FeO), manganese oxide (MnO), lead oxide (PbO), and zinc oxide (ZnO) dissolved within the liquid slag and baghouse dust are reduced. The resultant metallic iron and manganese settle to the bottom of the treatment vessel. The more volatile reduced lead and zinc are vaporized within the heat activated treatment vessel.

An off-gas with reduced lead vapor, reduced zinc vapor, and carbon monoxide gas exit the treatment vessel through a flue conduit and thereafter through a flue pipe. The off-gas is injected into a combustion chamber with excess combustion air and reacts with the carbon monoxide to form carbon dioxide. It also oxidizes the lead vapor and zinc vapor. The lead oxide, zinc oxide, and carbon dioxide are cooled in a cooling chamber, and the solid lead oxide and solid zinc oxide are subsequently captured via filtration in a filter chamber. The cleaned, cooled, carbon dioxide is discharged to a stack.

After heat treatment, the treated liquid slag, existing as a top layer within the movable lower shell portion of the treatment vessel, is tapped at a tapping station by decanting the slag away from the reduced molten metal bottom layer.

In one embodiment, the movable lower shell portion of the treatment vessel is equipped with wheels for coupling to a rail to bring the lower shell portion in proximity with the EAF. In an alternative embodiment, the movable lower shell portion of the treatment vessel is moved by a rotatable beam having a support fork, which supports and transports the movable lower shell portion. The EAF and treatment vessel are preferably operated by an AC power source. Alternative embodiments include, but are not limited to, a DC or plasma power source.

OBJECTS OF THE INVENTION

The principal object of the present invention is to provide an apparatus and method for processing liquid slag and baghouse dust byproducts from an EAF to recover metal values.

A further object of the invention is to provide an apparatus and method for processing liquid slag and baghouse dust from an EAF that minimizes pollution of the corresponding steelmaking plant from which the slag and dust are produced.

A further object of the invention is to provide an apparatus and method for processing liquid slag and baghouse dust from an EAF that is energy efficient and provides for safe handling and reduced disposal costs.

BRIEF DESCRIPTION OF THE DRAWINGS

The foregoing and other objects will become more readily apparent by referring to the following detailed description and the appended drawings in which.

DETAILED DESCRIPTION

Figure 1:
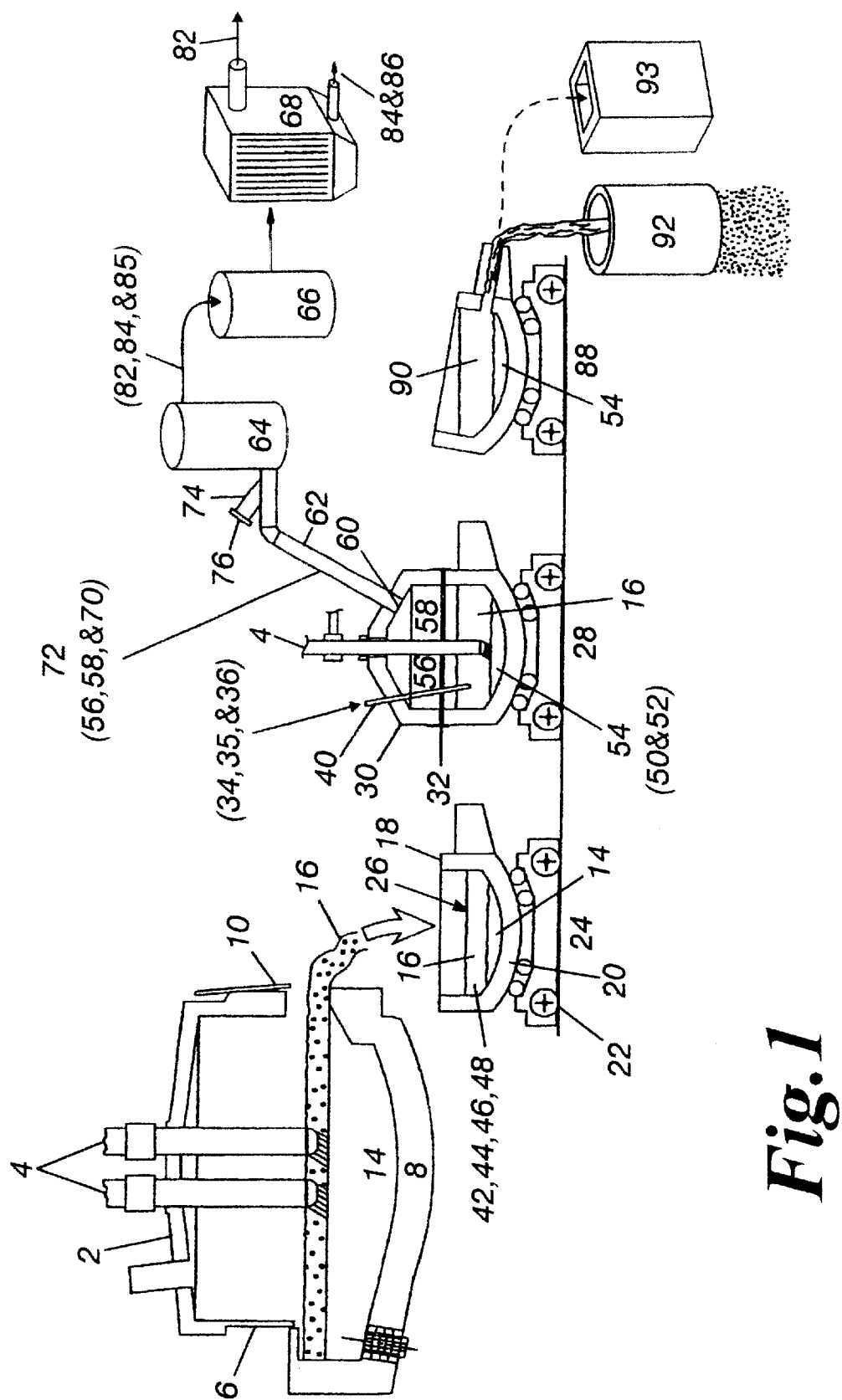
FIG. 1 is a schematic diagram of apparatus for processing liquid slag and baghouse dust from an EAF in accordance with the present invention.
Figure 2:
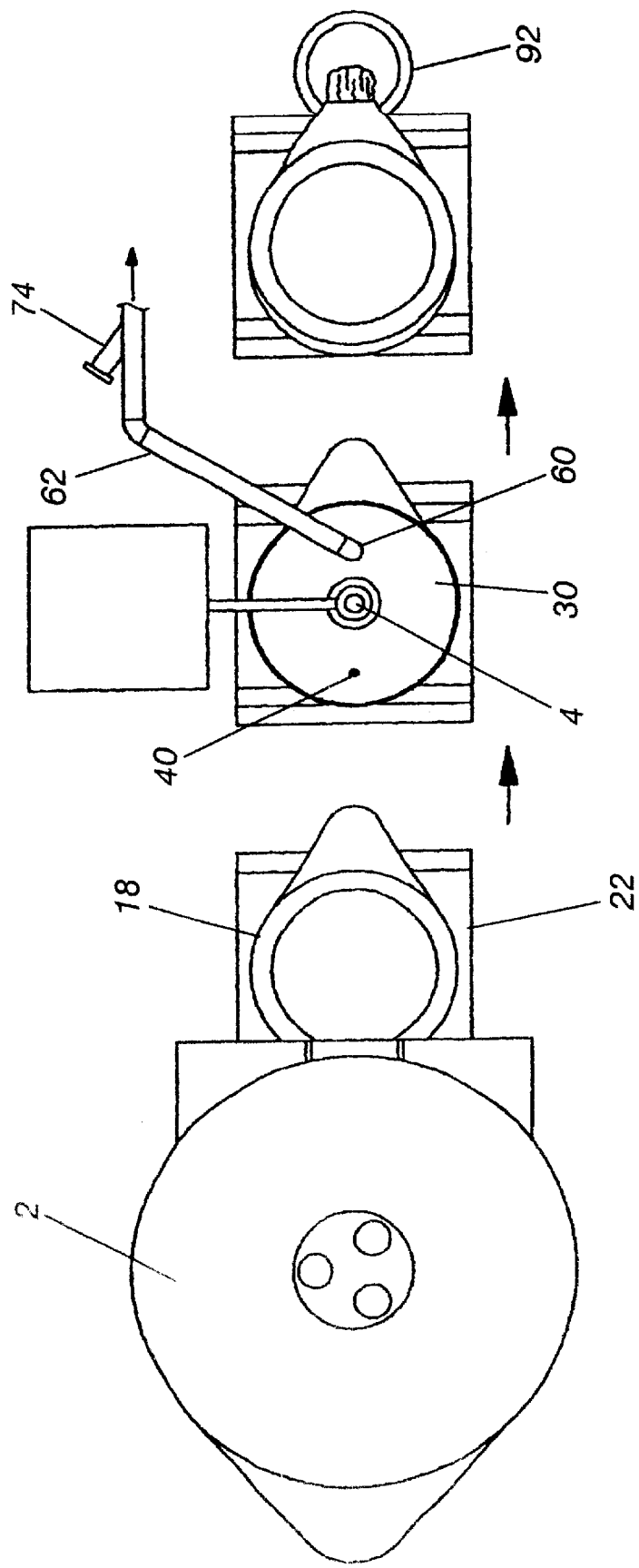
FIG. 2 is a top view of the preferred embodiment of an apparatus for processing liquid slag and baghouse dust from an EAF in which the movable lower shell portion of the treatment vessel is equipped with wheels.

The present invention is a method and apparatus for processing liquid slag and baghouse dust from an electric arc furnace that recovers valuable metals and reduces the levels of hazardous components contained in the slag and dust. The method employs a treatment vessel which receives liquid slag from an EAF and baghouse dust from the steel making process. The treatment vessel heats and treats the slag and dust such that the valuable metallic components are recovered and the unwanted contaminants are treated to facilitate subsequent elimination.

Referring to the drawings, the apparatus is primarily a treatment vessel 32 having a separate upper shell portion 30 and movable lower shell portion 18. The upper shell portion 30, which is preferably stationary and may be removably coupled to the lower shell portion 18, provides openings for 1 to 3 electrodes as a power source 4, a lance 40 for input of baghouse dust and other components used in the operation of the treatment vessel 32, and a flue conduit 60 for exhaust of gases and dust from the vessel 32.

The lower shell portion 18 is a refractory lined container which is removably coupled to the upper shell portion 30. The lower shell portion 18 has an open top end for reception of liquid slag from an EAF and preferably has a ladle 20 to facilitate the tapping of slag and/or a layer of metallic components from the lower shell portion 18 after treatment in the vessel 32.

The lower shell portion 18 is movable with respect to the actual EAF and also with respect to the upper shell portion 30. When receiving slag, the lower shell portion 18 is positioned in close proximity to and in communication with the EAF. So that treatment according to the invented method does not unduly interfere with the otherwise normal operation of the EAF, the loaded lower shell portion 18 is movable between the EAF and the location of the upper shell portion 30, which may be located some distance from the EAF. Although movement of the lower shell portion may be accomplished by any means known in the art, it is preferred that the entire lower portion 18 be supported by a carriage having wheels 22 which rest upon a track along which the lower portion 18 is propelled.

Untreated slag 16 to be treated by the invented process and apparatus is supplied by a typical EAF in which a metallic charge, such as commercial scrap, is melted. The typical EAF 2 has an introduction port 6 for introduction of charge materials to the furnace 2, an overflow port 10, and a hearth 8 for containment of the charge materials. Heat is provided by electrodes 4, and the EAF transforms the metallic charge into a bottom layer of molten metal 14 and a top layer of liquid slag 16. Typically, the EAF periodically undergoes a three to four minute deslagging process during which the liquid slag, at a temperature of approximately 1580° C., is removed from the EAF by allowing the liquid slag to overflow from the EAF. Description of the EAF is provided herein merely to facilitate understanding of the invention. The described EAF and its operation are not claimed as part of the instant invention.

Untreated slag 16 from the EAF is collected into the lower shell portion 18. During collection of the untreated slag 16 from the EAF, the lower shell portion 18 is positioned at a reception station 24, located in close proximity to the EAF. Prior to receiving the untreated slag 16 from the EAF, the movable lower shell portion 18, into which the slag is collected is maintained at approximately 1300° C. after the preceding treatment cycle. Since the lower portion 18 is involved in processes involving extremely high temperatures, it is not necessary to provide a supplemental heat source to the lower shell 18 in order to maintain a temperature of approximately 1300° C. between cycles, provided the upper and lower shells of the reaction vessel are closed and sealed between treatment cycles.

After collection of the untreated slag 16 into the lower portion 18, a silicon dioxide (sand) compound 26, which is preferably preheated to an approximate temperature of 1200° C., is then added to the liquid slag 16. The silicon dioxide 26 reduces the lime/silica ratio to just above 1. The silicon dioxide is preferably preheated to approximately 1200° C. through use of waste heat given off as a result of combustion in combustion chamber 64, described herein below. The preheated silicon dioxide 26 aids in slowing the temperature drop of the slag 16 when placed into the lower shell portion 18, since the liquid slag is placed within the lower shell portion 18 at approximately 1580° C. and will remain liquid down to approximately 1400° C. or lower. The sand addition brings the V-ratio (or basicity ratio) $CaO/SiO_2$ to a value that will result in a non-leachable slag when solidified. It can be done without energy consumption since it lowers also the liquidus temperature of the resulting new composition of the slag.

Figure 3:
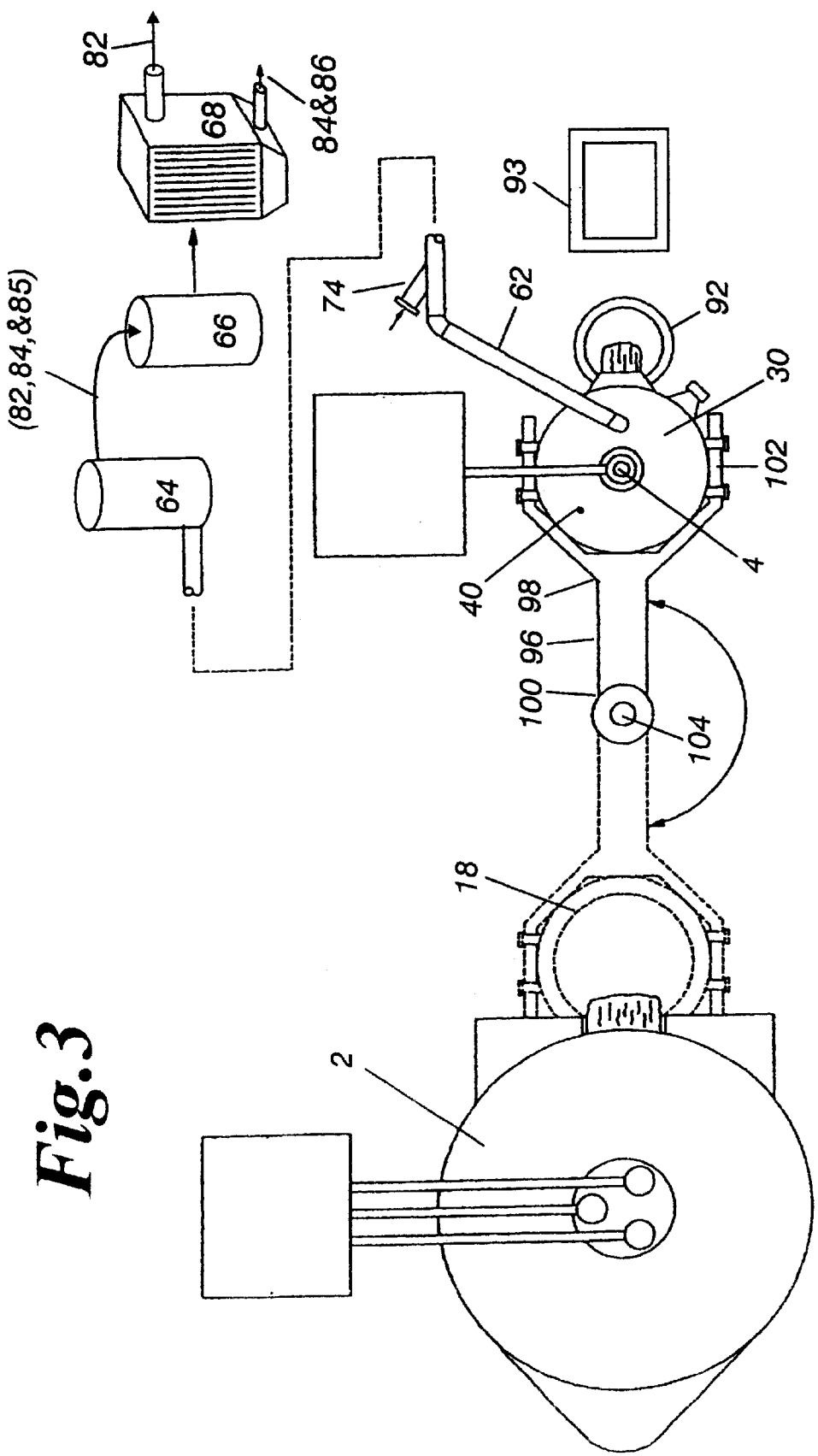
FIG. 3 is a top view of an alternative embodiment of an apparatus for processing liquid slag and baghouse dust from an EAF in which the movable lower shell portion of the treatment vessel is movable via a rotatable beam.

Once the slag 16 and preheated sand 26 are present within the movable lower shell portion 18, the lower shell portion 18 is moved from the reception station 24 to a treatment station 28. As mentioned, the preferred lower shell portion 18 is movable via a carriage with wheels 22. As an alternative embodiment (FIG. 3), the movable lower shell portion 18 is movable via a rotatable beam 96 having a support fork end 98, and a pivot end 100 opposite the support fork end 98. The support fork end 98 has a support fork 102 for supporting the movable lower shell portion 18. The pivot end 100 has a pivot 104 for rotatably moving the lower shell portion 18 from the reception station 24 to the treatment station 28.

At the treatment station 28, the upper shell portion 30 of the treatment vessel 32 is coupled to the lower shell portion 18 of the treatment vessel 32. After coupling, energy is supplied via a power source 4 to the treatment vessel 32. The temperature required for reduction of the metallic oxides in the vessel which range from 1400 to 1450° C. is maintained during the treatments, while a source of carbon 34 is combined with baghouse dust 36 and an inert gas 35 such as nitrogen, and fed to the molten slag. The carbon 34 is typically supplied from coal derived coke, but may be obtained from any source having substantially the same chemical activity. The primary constituents of the baghouse dust 36 generated by the EAF are zinc, calcium oxide, iron, lead, chlorine, magnesium, and manganese oxides, along with small amounts of a wide variety of other metallic oxides.

The carbon 34, baghouse dust 36, and inert gas 35 are inserted within the reaction vessel 32 via a lance 40 which passes through the upper shell 30 into the space enclosed between the upper 30 and lower 18 shell portions. The carbon 34 and inert gas 35 act to reduce the desired metallic components contained within the slag 16 and baghouse dust 36, hereinafter collectively referred to as reacted slag 16 or simply slag 16. The molten iron oxide (FeO and/or $Fe_2O_3$) 42, molten manganese oxide (MnO) 44, molten lead oxide (PbO) 46 and molten zinc oxide (ZnO) 48, which are dissolved within the liquid slag 16, are reduced. The resultant reduced iron 50 and reduced manganese 52 settle to the bottom of the treatment vessel 32. The resultant reduced lead and reduced zinc are in the vapor phase within the treatment vessel 32 at operating temperatures.

Reduced lead vapor 56, reduced zinc vapor 58 and carbon monoxide gas 70 collectively referred to as an off-gas 72 exit the treatment vessel 32 through a flue conduit 60 which passes through the upper shell 30. The flue conduit 60 is subsequently connected in series to a flue pipe 62, a combustion chamber 64, a cooling chamber 66, and a filter chamber 68. A combustion air duct 74 is connected to the flue pipe 62, between the upper shell 30 and the combustion chamber 64. The off-gas 72 flows through the flue pipe 62 into the combustion chamber 64, where it is combined with an oxygen containing combustion gas 76 such as air, which enters through the combustion air duct 74. Within the combustion chamber 64, the oxidizing air 76, which is present in excess (i.e., five percent or more excess oxygen), reacts with the reduced lead vapor 56 and reduced zinc vapor 58 to produce lead oxide 78 and zinc oxide 80, and combusts the carbon monoxide gas 70 to produce carbon dioxide 82. The off-gas 72 then enters a cooling chamber 66 where the lead oxide 84 and zinc oxide 86 are cooled. The oxides 84, 86 are subsequently captured via filtration in the filter chamber 68.

Upon reduction, the resultant reduced molten iron 50 and reduced molten manganese 52 settle to the bottom of the treatment vessel 32 as reduced molten metal 54 having a typical partial composition of approximately 4.5% Carbon, 0.3% Silicon and 7.4% Manganese, the balance being iron. The upper shell portion 30 of the treatment vessel 32 is subsequently removed from the movable lower shell portion 18, and the movable lower shell portion 18 is then moved to a tapping station 88.

Preferably, the lower shell 18 is a bowl-shaped structure having a rounded bottom surface. The lower shell 18 rests upon a series of rollers 21 which are connected to a carriage having wheels 22. In operation, the wheels 22 enable movement of the lower shell 18 from the reception station 24 to the treatment station 28, the tapping station 88, and then back to the reception station 24. During tapping in station 88, the lower shell 18 is moved along rollers 21 such that the lower shell 18 tilts sideways, allowing the treated slag 16 to flow through granulator 92.

The treated slag 16, within the movable lower shell portion 18, is first tapped by decanting the treated slag 16 off of the reduced molten metal 54 and into a granulator 92 for cooling and granulating the treated slag 16. The reduced molten metal 54 is subsequently tapped by pouring the molten metal 54 into a granulator 92 for granulating the reduced molten iron 50, having a high content of said reduced molten manganese 52. Alternatively, the molten metal can be poured into an ingot mold 93. As a result, the valuable metals, molten iron 50 and molten manganese 52, are recovered as ingots or granulated iron.

The invented apparatus and process recover valuable amounts of iron and manganese from the EAF slag and recover valuable amounts and iron, lead, and zinc from the EAF baghouse dust. In addition to the value of the metal components recovered, the treated slag is non-leachable and possesses cementitious properties which are suitable for recycling uses such as additives in cement, concrete and other general construction. Also, the volume of output baghouse dust, which is considered a hazardous waste, is greatly reduced by the removal of zinc, lead, and iron, thus lowering the cost of treatment and disposal.

EXAMPLES

The data disclosed in the examples is based upon the use of a metallic charge, such as H.M. #2 (heavy melting scrap), to produce carbon steel. The liquid slag leaving an EAF having a metallic charge of H.M. #2 becomes a liquid at 1400° C. and has the following composition in weight percent:

| Typical Liquid Slag Composition (Untreated Slag) | (Weight Percent) |
|---|---|
| Calcium Oxide (CaO) | 39.9% |
| Iron(II) Oxide (FeO) | 15.9% |
| Silicon Dioxide (SiO$_2$) | 14.1% |
| Magnesium Oxide (MgO) | 13.5% |
| Aluminum Oxide (Al$_2$O$_3$) | 10.0% |
| Manganese Oxide (MnO) | 6.5% |
| Phosphorus Trioxide (P$_2$O$_3$) | 0.5% |

The typical weight percent composition of dust captured in and collected from the baghouse filters of an EAF is known to be:

| Typical Baghouse Dust Composition | (Weight Percent) |
|---|---|
| Zinc (Zn) | 27.80% |
| Calcium Oxide (CaO) | 17.03% |
| Iron (Fe) | 16.60% |
| Lead (Pb) | 3.34% |
| Chlorine (Cl) | 2.30% |
| Magnesium (Mg) | 1.72% |
| Manganese (Mn) | 1.60% |
| Silicon Dioxide (SiO$_2$) | 1.40% |
| Sodium (Na) | 1.25% |
| Aluminum Oxide (Al$_2$O$_3$) | 0.32% |
| Copper (Cu) | 0.21% |
| Cadmium (Cd) | 0.09% |
| Chromium (Cr) | 0.09% |
| Nickel (Ni) | 0.02% |
| Barium (Ba) | 0.01% |
| Vanadium (V) | 0.01% |
| Arsenic (As) | 0.0033% |

The preferred source of carbon is coal, which generally has a carbon content of approximately 76%.

Example 1

The following example shows the amount of metallic components recoverable from EAF slag corresponding to one tonne of tapped molten steel. The silicon dioxide in this Example is input to the lower shell portion of the treatment vessel at room temperature. Component temperatures and electrical energy input is also shown.

| Inputs | |
|---|---|
| 100 kg Untreated Slag (1400° C.) | |
| 20.2 kg SiO$_2$ (25° C.) | |
| 11 kg dust (25° C.) | |
| 6.44 kg coal (25° C.) | |
| 39 kWh | |
| Outputs | |
| 107 kg Treated Slag (1400° C.) | |
| CaO | 38.8% |
| SiO$_2$ | 32.3% |
| MgO | 12.9% |
| Al$_2$O$_3$ | 9.5% |
| MnO | 5.1% |
| FeO | 0.9% |
| P$_2$O$_3$ | 0.41% |
| S | 0.032% |
| -continued | |
| 15.3 kg Molten Metal (1400° C.) | |
| Mn | 7.4% |
| C | 4.5% |
| Si | 0.29% |
| Cu | 0.15% |
| Ni | 0.014% |
| P | 39 ppm |
| S | 16 ppm |
| 7.85 NM$^3$ Gas (1400° C.) | |
| CO | 99.6% |
| SO$_2$ | 0.034% |
| As | 14 ppm |
| 3.573 kg Vapor (1400° C.) (metal in vapor phase) | |
| Zn | 85.6% (3.06 kg) |
| Pb | 10.3% (0.37 kg) |
| Na | 3.9% (0.14 kg) |
| Cd | 0.3% (0.01 kg) |

If room temperature slag is instead fed into the treatment vessel using the same configuration previously mentioned, the energy consumption will be 110 kWh, rather than 39kWh. If the heat from the off-gas and combustion chamber can be used for preheating the silicon dioxide up to a reasonable temperature of 1200° C. prior to the addition of the sand into the movable lower shell portion, the electricity input can be decreased to about 103kWh.

The energy requirement for heat activation of the treatment vessel is supplied by 39 kWh of electricity. This energy requirement is based on preheating the sand to 1200° C. with the off-gas, assuming a 95% heat transfer efficiency from the DC arc and a 4% loss of the total energy within the treatment vessel itself.

The products obtained from the apparatus and method for processing the liquid slag and baghouse dust byproducts of an EAF are, per tonne of liquid steel produced in the EAF:

1) Approximately 15.3 kg of granulated iron, with a high manganese content, which can be used as valuable charge material in iron or steel foundries.

2) Approximately 0.43 kg of lead oxide (PbO) that can be used for production of lead metal or other products.

3) Approximately 3.8 kg of zinc oxide (ZnO) that can be used for production of zinc metal or other products, such as paint.

4) Approximately 108.6 kg of granulated treated slag can be used in the cement industry or the construction industry.

Considering that a medium size electrical arc furnace of the modem steel mill produces 100 tonnes of liquid steel per hour, the output per hour of the liquid slag and baghouse dust treatment will be:

1.53 metric tonnes of granulated iron with high manganese content 0.043 metric tonnes of lead oxide (PbO)

0.38 metric tonnes of zinc oxide (ZnO)

10.86 metric tonnes of granulated treated slag

Example 2

Coal-oxygen heating of slag is accomplished with an oxy-fuel burner. All figures are per tonne of tapped molten steel. The silicon dioxide in the present invention will be heated to 1200° C., unlike the room temperature sand in this example.

| Inputs |
| --- |
| 100 kg slag (1400° C.) |
| 18.4 kg $SiO_2$ (25 ° C.) |
| 11 kg dust (25° C.) |
| 42.1 kg coal (25° C.) (partially for reduction; partially for heating) |
| 25 $Nm^3$ |

| Outputs | |
| --- | --- |
| 108.6 kg Slag (1400° C.) | |
| CaO | 38.5% |
| $SiO_2$ | 32.0% |
| MgO | 12.7% |
| $Al_2O_3$ | 10.3% |
| MnO | 5.1% |
| FeO | 0.9% |
| $P_2O_3$ | 0.46% |
| S | 0.21% |
| 15.3 kg Molten Metal (1400° C.) | |
| Mn | 7.3% |
| C | 4.5% |
| Si | 0.29% |
| Cu | 0.15% |
| Ni | 0.014% |
| S | 0.01% |
| P | 39 ppm |
| 56.65 $NM^3$ Gas (1400° C.) | |
| CO | 99.9% |
| $SO_2$ | 0.032% |
| As | 2 ppm |
| 3.573 kg Vapor (1400° C.) | |
| Zn | 85.6% (3.06 kg) |
| Pb | 10.3% (0.37 kg) |
| Cd | 0.3% (0.01 kg) |
| Na | 3.9% (0.14 kg) |

This shows that utilizing electric energy is better.

ALTERNATIVE EMBODIMENT

If it is desired to obtain metallic lead and zinc rather than their oxides, the vapors exiting the treatment vessel are injected into a bath of molten zinc and/or lead, which bath is maintained at a temperature in the range of 500 to 600° C. The lead and zinc becomes molten and is thus recovered in metallic form.

The production of lead and zinc oxides simplifies the required equipment, and because only a small amount of these materials are produced, the capital investment is less.

SUMMARY OF THE ACHIEVEMENT OF THE OBJECTS OF THE INVENTION

From the foregoing, it is readily apparent that I have invented an apparatus and method for processing liquid slag and baghouse dust byproducts from a steelmaking furnace such as an EAF to recover valuable metals, such as iron, manganese, lead oxide and zinc oxide; which the pollution by the corresponding steelmaking plant from which the slag and dust are produced; which minimizes the amount of hazardous chemicals contributing to the chemical composition of the slag; and thus provides for safer handling and reduced disposal costs of waste materials.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for processing liquid slag and baghouse dust generated by a steelmaking furnace to recover valuable metals utilizing an apparatus having a lower shell and an upper shell, said method comprising:

introducing liquid slag from said furnace to a lower shell portion;

introducing sand to said liquid slag;

positioning said lower shell portion underneath said upper shell portion;

coupling said lower shell portion to said upper shell portion to form a chamber;

simultaneously adding a source of carbon to the liquid slag, adding baghouse dust to the liquid slag, and heating the liquid slag, and forming a molten metal layer in said lower shell portion with a slag layer thereon;

exhausting gases from the chamber, said gases containing carbon monoxide, reduced lead vapor, and reduced zinc;

decoupling said lower shell portion from said upper shell portion; and, tapping the lower shell portion, thereby removing the slag from the molten metal layer in the lower shell portion.

2. The method of claim 1, further comprising maintaining the temperature of said liquid slag from about 1400° C. to about 1500° C.

3. The method of claim 1, further comprising preheating said sand to at least about 1200° C. prior to introducing said sand to said liquid slag.

4. The method of claim 1, further comprising placing an inert gas into said chamber concurrent with the addition of said source of carbon to the liquid slag.

5. The method of claim 4, wherein the inert gas is nitrogen.

6. The method of claim 1, wherein the source of carbon is coal derived coke.

7. The method of claim 1, further comprising combining exhaust gases with an oxygen containing combustion gas, oxidizing said lead vapor, oxidizing said zinc, and combusting said carbon monoxide.

8. The method of claim 7, further comprising solidifying oxidized zinc oxide and oxidized lead oxide.

9. The method of claim 8, further comprising filtering said oxidized zinc oxide and lead oxide.

10. The method of claim 1, further comprising cooling and granulating said tapped slag.

11. The method of claim 1, further comprising tapping said metal, cooling and granulating said metal.

12. The method of claim 1, further comprising tapping said metal into ingots.

13. The method of claim 1, further comprising introducing sufficient sand to said liquid slag to maintain a basicity ratio of CaO/SiO2 approaching 1.0.

14. The method of claim 1, wherein substantially all slag and baghouse dust by products introduced into the lower shell portion is recovered as a useful material, either as valuable metals or oxides, or as granulated, non-leachable slag useful as raw material for production of portland cement, or as aggregate in construction.

15. The method of claim 1 wherein the baghouse dust is provided directly form a baghouse or from previously accumulated baghouse dust.

16. The method of claim 1 wherein carbon and baghouse dust are added to the liquid slag by lance injection.

* * * * *